Figure 1:
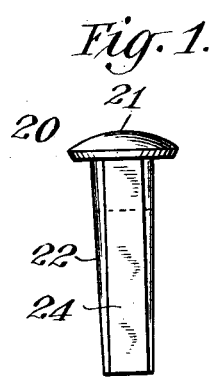

C. S. EATON.
RIVET.
APPLICATION FILED FEB. 12, 1914.

1,120,378.

Patented Dec. 8, 1914.

WITNESSES

INVENTOR
C. S. Eaton
BY
ATTORNEY

UNITED STATES PATENT OFFICE.

CLARA S. EATON, OF NEW YORK, N. Y.

RIVET.

1,120,378.  Specification of Letters Patent.  Patented Dec. 8, 1914.

Application filed February 12, 1914. Serial No. 818,189.

*To all whom it may concern:*

Be it known that I, CLARA S. EATON, a citizen of the United States, and a resident of the borough of Manhattan, city and State of New York, have invented certain new and useful Improvements in Rivets, of which the following is a specification.

This invention relates to rivets and especially to two pronged rivets adapted to secure the plates of a belt fastener to a belt.

One of the objects of the invention is to provide a rivet of such construction that it can be used only with a plate especially adapted for said rivet.

Other objects will appear from the hereinafter description.

The novel features of the invention will be understood from the description taken in connection with the accompanying drawing in which the same reference character indicates the same part in the several views.

Figure 2:
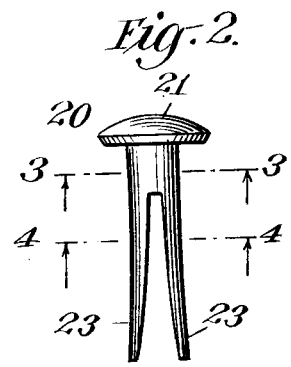
Figure 3:
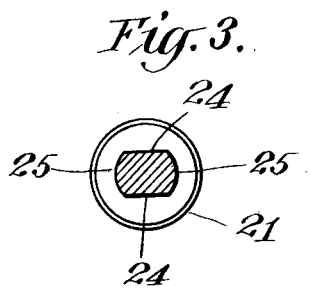
Figure 4:
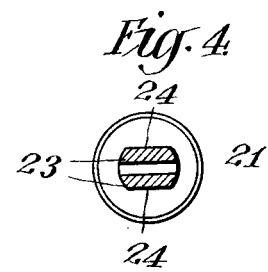

Referring to the drawing: Figure 1 is a side elevation on an enlarged scale of one embodiment of the invention. Fig. 2 is another view at right angles to Fig. 1. Fig. 3 is a section on line 3 of Fig. 2. Fig. 4 is a section on line 4 of Fig. 2.

The rivet 20 is provided with a preferably rounded and beveled head 21 and a shank 22. The shank is bifurcated to form the two legs 23, and the outer surface of the legs and shank under the head is provided with flat sides 24 and opposing rounded sides 25 which correspond respectively with the flat sides and rounded opening of a plate with which these rivets are to be used. The outer ends or prongs of the rivets are preferably slightly expanded or separated as shown.

It is to be understood that the head of the rivet may be circular or elliptical, and where the term "flat side" has been used it is not to be understood that each flat side, lies in a single plane, as each side may be slightly curved.

Having now described my invention, what I claim as new and desire to secure by Letters Patent is:

A rivet having an enlarged head and a shank, the shank having opposing rounded sides and opposing substantially flat sides extending to the head, the shank being bifurcated part of the distance leaving a solid part between the head and the crotch of the bifurcation.

In witness whereof I have hereunto set my hand at the borough of Manhattan, city and State of New York, this 10th day of February, 1914.

CLARA S. EATON.

In presence of—
ISABEL R. RICHARDS,
AGNES C. O'CONNELL.

Copies of this patent may be obtained for five cents each, by addressing the "Commissioner of Patents, Washington, D. C."